United States Patent [19]
Johnson

[11] 3,771,392
[45] Nov. 13, 1973

[54] COMBINATION STEADY-REST AND TOOL HOLDER

[76] Inventor: Carl A. Johnson, 112 E. Palmetto Ave., Box 58, Howey-in-the-Hills, Fla. 32737

[22] Filed: Sept. 7, 1972

[21] Appl. No.: 286,894

[52] U.S. Cl. .................................. 82/35, 29/97.5
[51] Int. Cl. ..................... B23b 29/14, B23b 29/16
[58] Field of Search ................ 82/35, 46, 76, 77; 29/97.5

[56] References Cited
UNITED STATES PATENTS

| 1,228,570 | 6/1917 | Kupp | 82/35 |
| 1,245,020 | 10/1917 | Pianarosa | 29/97.5 |
| 407,972 | 7/1889 | Springer | 82/35 |

FOREIGN PATENTS OR APPLICATIONS

| 349,488 | 3/1922 | Germany | 82/35 |

*Primary Examiner*—Leonidas Vlachos
*Attorney*—William M. Hobby et al.

[57] ABSTRACT

A steady-rest for a workpiece held by a lathing machine includes means for holding a cut-off tool in a direction normal to the workpiece, and further includes means for advancing the cut-off tool.

5 Claims, 6 Drawing Figures

PATENTED NOV 13 1973 3,771,392

COMBINATION STEADY-REST AND TOOL HOLDER

BACKGROUND OF THE INVENTION

1. Field of the Invention

The present invention relates to lathing machines, and in particular to accessories for lathes which are designed to steady the workpiece in the lathe and carry a cut-off tool in combination therewith.

2. Description of the Prior Art

Lathes are employed for a variety of cutting and turning operations. Generally, a lathe includes a "headstock" having a chuck or collet which is adapted to hold and turn one end of the workpiece. The lathe further includes longitudinal ways extending away from the headstock, with the workpiece juxtaposed above the ways.

When the workpiece comprises a piece of cylindrical stock, it is customary to employ a lathe accessory known as a "steady-rest." The steady-rest is movably mounted in the longitudinal ways of the lathe, and has an opening therethrough which is adapted to receive the workpiece. Means extending through the steady-rest, such as adjustable screws or bearing rollers, are used to steady the workpiece during the lathing operation.

Most prior art lathes employ cut-off tools mounted on carriages which are adapted to traverse the cut-off tool back and forth transverse to the longitudinal ways. There has been some suggestion in the prior art to combine the steady-rest and tool holding functions into a single attachment; see, for example, U. S. Pat. Nos. 2,420,945 to Gaylord, and 2,395,365 to Wilson et al. However, such prior art arrangements are not suitable for many operations such as cutting completely through the workpiece. Other arrangements, alternately referred to as roller boxes or box tools, are adapted to receive the workpiece and hold the cutting tool. Such arrangements, however, are mounted only on the lathe turret or on the transverse carriage. See for example U. S. Pat. Nos. 2,513,819 to Saunders, 2,473,418 to Fellroth and 3,385,146 to Head.

SUMMARY OF THE INVENTION

The present invention comprises a combination steady-rest and tool holder accessory for a lathe machine of the type having ways longitudinal thereto. The combination apparatus comprises a body member having an opening therethrough which is adapted to receive a workpiece. The apparatus further includes means for movably mounting the body member in the ways, and a cutting tool holding member joined to the periphery of the body member. A cut-off tool is slidably mounted in the tool holding member and the apparatus includes means for advancing the tool against the workpiece.

THE DRAWING

FIG. 3b is a partial cross-section of the embodiment of FIG. 3a.

FIG. 4b is a partial cross-section of the embodiment of FIG. 4a.

DETAILED DESCRIPTION

Figure 1:
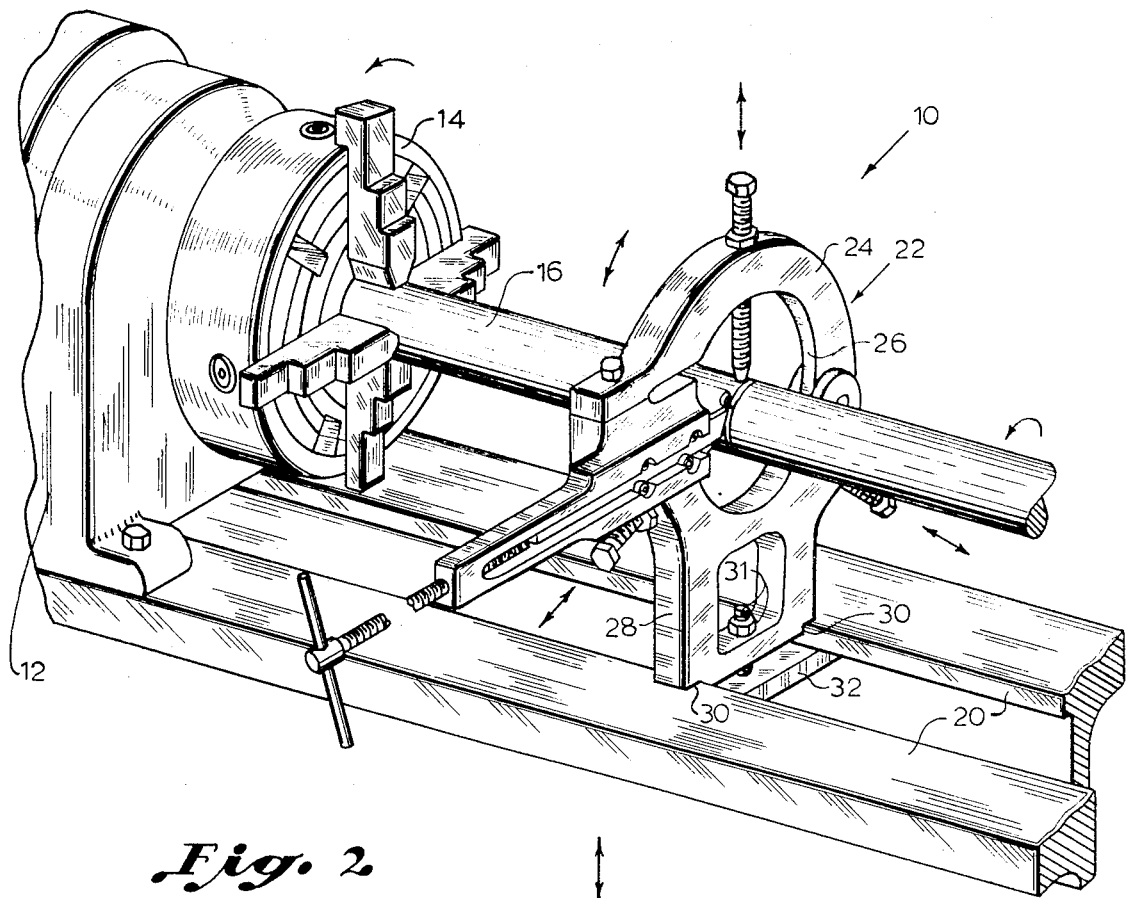
FIG. 1 is a perspective view of a lathe employing the combination steady-rest and tool holder of the present invention.

A lathe employing the combination steady-rest and tool holder of the present invention is referred to generally as 10 in FIG. 1.

The lathe 10 includes a headstock 12 having a chuck 14 associated therewith, the chuck 14 being adapted to receive one end of a workpiece 16. The chuck 14, and consequently the workpiece 16, is turned by a motor (not shown) within the headstock 12. The lathe 10 further includes longitudinal ways 20 extending axially with the headstock 12.

A combination steady-rest and tool holder 22 in accordance with the present invention is mounted in the longitudinal ways 20. This combination rest 22 generally includes a metallic body member 24 having an opening 26 therethrough which is adapted to receive the workpiece 16. A vertical bracket 28 is joined to the body member 24, and includes indentations 30, a bolt 31 and a clamp 32 for movably mounting the combination steady-rest 22 in the longitudinal ways 20. As shown in FIG. 1, the body member 24 and the bracket 28 may comprise an integral metallic member.

Figure 2:
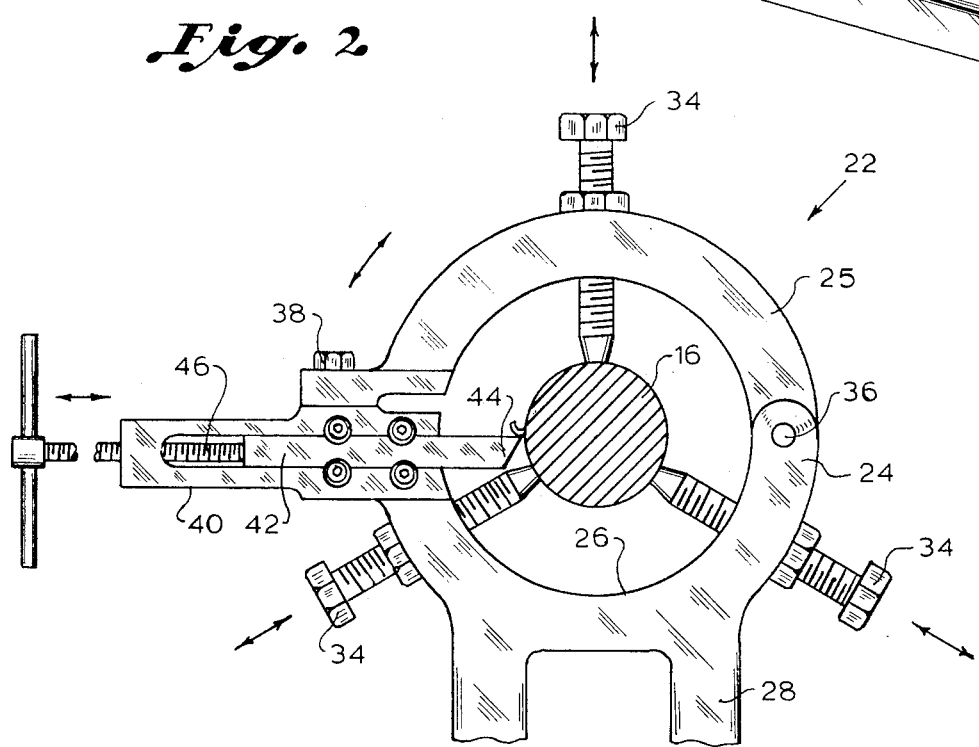
FIG. 2 is a front view of the embodiment of the combination steady-rest of the present invention shown in FIG. 1.

The combination steady-rest 22 is shown in greater detail in FIG. 2. The steady-rest 22 further includes at least three set screws 34 which extend through the body member 24 and are adapted to steady the workpiece 16 in the opening 26. While it is not necessary to this invention, the body member 24 preferably has an upper portion, or "gate," 25 which is rotatably joined at a pivot 36, such that the upper portion 25 can be rotated away from the opening 26 to facilitate insertion of the workpiece 16 into the chuck 14 without requiring the complete removal of the steady-rest 22 from the longitudinal ways 20. The upper portion 25 is secured to the bottom portion of the body member 24 by a bolt 38.

The combination steady-rest 22 further comprises a cutting tool holding member 40 joined to an outer side of the body member 24. The tool holding member 40 may also be formed integrally with the body member 22. A cut-off tool 42 is slidably mounted in the tool holder 40, and has a cutting end 44 which is adapted to extend into the opening 26 at right angles to, and against the workpiece 16. Screws 41 slidably engage the cut-off tool 42 and hold the tool in the holding member 40. A threaded screw 46 extends axial to the cutting tool 42 and through the end of the tool holding member 40 distal to the body member 24, to provide means for advancing the tool 44 against the workpiece 16.

Figure 3A:
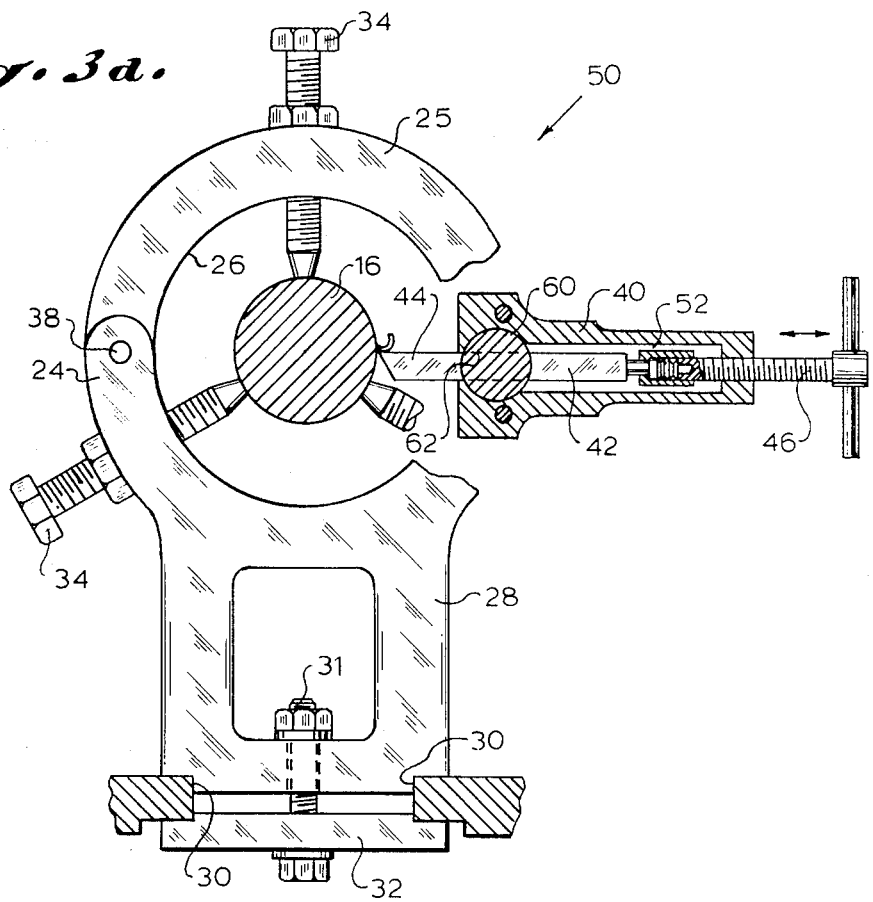
FIG. 3a is a front view of another embodiment of the present invention, with portions cut away.
Figure 3B:
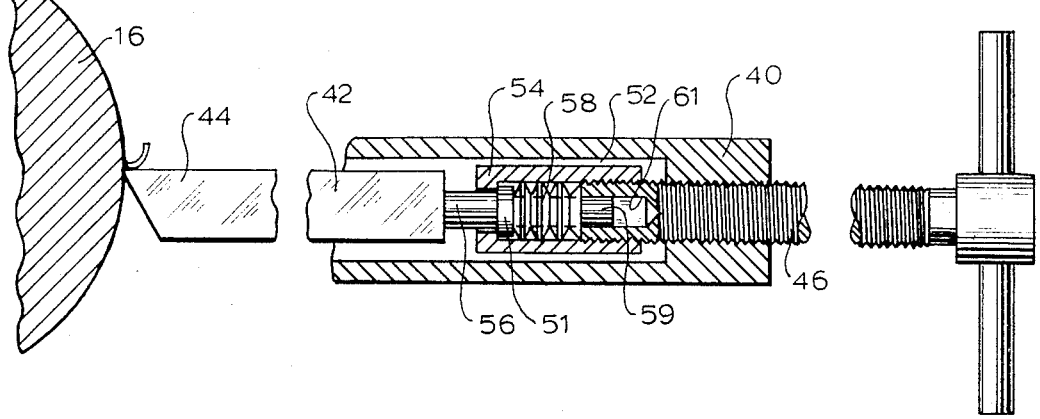

An alternate embodiment of the combination steady-rest and tool holder of the present invention is shown in FIG. 3a and referred to generally as 50. The steady-rest 50 is essentially similar to the steady-rest 22 of FIG. 2, except that the steady-rest 50 includes a spring tension member 52 interposed between the tool advancing screw 46 and the tool 42, to provide preloaded spring tension along a line axial with the tool. The tension member 52 is shown in detail in FIG. 3b, and includes a housing 54 through which the advancing screw 46 is threaded. A plunger 56 extends into the housing 54 and includes a larger diameter portion 51 engaging the inside of the housing 54. The smaller diameter portion 59 extends into an opening 61 axial along the advancing screw 46, and has a plurality of alternately faced preloaded spring washers 58 axial therewith, each washer 58 being interposed between the advancing screw 46 and the larger diameter portion 51 inside the housing 54.

In use, the preloaded washers 58 maintain a tension against the tool 42, and thus, hold the tool rigidly against the workpiece 16. When a force is exerted axially into the cut-off tool 42 during the cutting operation sufficient to overcome the combined preloaded tension of the spring washers 58, the tool 42 moves axially back through the tool holding member 50. In this way damage to the workpiece 16 and scarring of the cutting end 44 of the cut-off tool is avoided. It will be appreciated by those skilled in the machining art that the desired spring tension will depend on the workpiece and the type of cutting operation, and that this tension can be adjusted to any given value by proper selection of the type and number of preloaded spring washers to be used.

Referring again to FIG. 3b, the combination steady-rest 50 also differs with respect to the steady-rest 22 of FIG. 2, in that the steady-rest 50 further comprises a fulcrum 60, which bears between the tool 42 and the inner side of the tool holding member 40. The fulcrum 60 includes a slot 62 therein which is adapted to receive the cut-off tool 42. In operation the fulcrum 60 provides a degree of oscillation, or "give," for the tool 42 with respect to the workpiece 16.

Figure 4A:
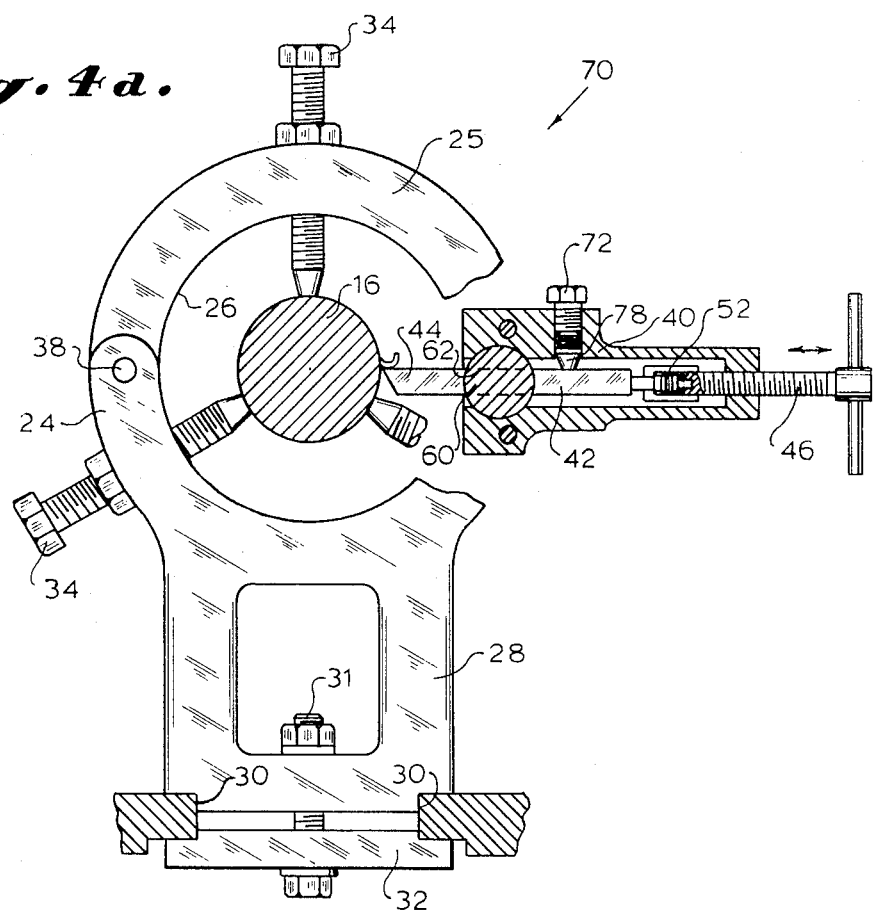
FIG. 4a is a front view of another embodiment of the present invention, with portions cut away.
Figure 4B:
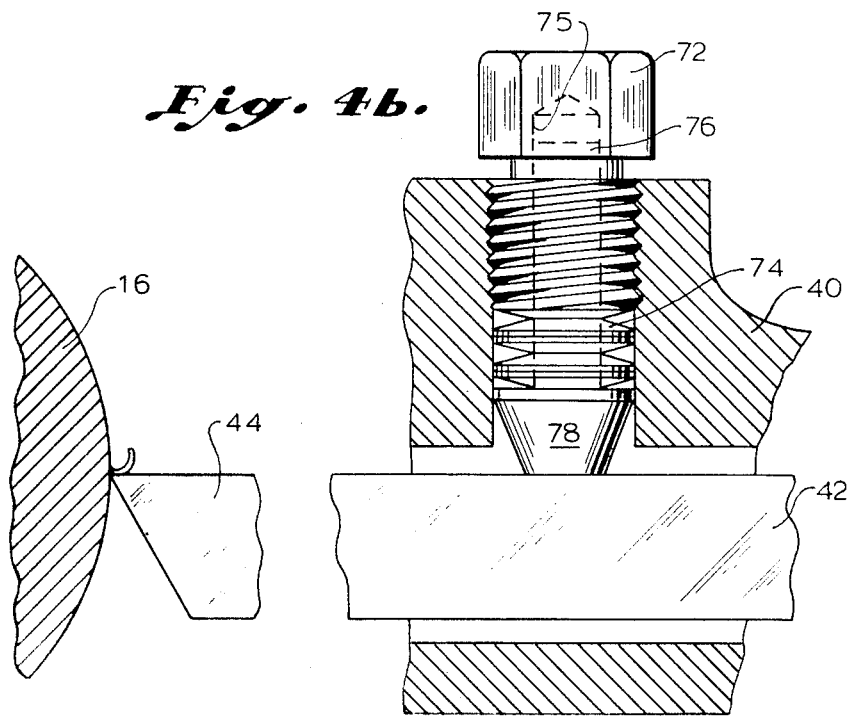

Yet another embodiment of the steady-rest of the present invention is shown in FIG. 4a and referred to generally as 70. The steady-rest 70 is similar to the steady-rest 50 of FIG. 3a and further includes spring tension means bearing against the tool 42 along a line substantially perpendicular thereto. As shown in FIG. 4a and in greater detail in FIG. 4b, this perpendicular spring tension means includes a threaded screw 72 extending into the tool holding member 40 with a plurality of preloaded spring washers 74 interposed between the screw 72 and the tool 42. The washers 74 are axial with a rod 76 extending into a hollow bore 75 of the screw 72, the rod 76 being integral with a larger head portion 78 which engages the washers 74. In operation, the plunger 76, the preloaded spring washers 74 and the screw 72 hold the tool 42 rigid until a given minimum force is exerted tangential to the cutting end 44 of the tool 42 sufficient to overcome the spring tension of the washers. As noted previously, this prevents damage to the workpiece 16 and scarring of the cutting end 44. It will be appreciated by those skilled in the art that the perpendicular tension means may be used alone, or in conjunction with the axial spring tension means, as shown in FIG. 4a.

Various other arrangements and alterations may be adapted for use with the above described embodiments without departing from the spirit and scope of the combination steady-rest and tool holder of the present invention.

I claim:

1. A combination steady-rest and cut-off tool holder for a lathe machine of the type having ways longitudinal to a means for holding a workpiece, comprising:

a body member having an opening therethrough and adapted to receive in said opening said workpiece held by said lathe;
means mounted in said body member for steadying said workpiece in said opening;
a cut-off tool holding member joined to an outer side of said body member;
a cut-off tool, slidably mounted in said holding member and adapted to extend into said opening at an angle to said workpiece;
a threaded screw for advancing said cut-off tool through said holding member and against said workpiece, said screw extending through said holding member at an end distal from said body member and along a line axial with said tool;
at least one preloaded spring washer interposed between said threaded screw and said tool;
another threaded screw extending normal to said tool through said holding member;
at least one preloaded spring washer interposed between said another screw and said tool;
means for movably mounting said body member in said longitudinal ways and
fulcrum means bearing between said tool and said tool holding member and including a slot therein adapted to receive said tool, said fulcrum adapted to provide a degree of oscillation for the tool with respect to the workpiece.

2. Apparatus as recited in claim 1 wherein said means for mounting comprises a vertical bracket joined to said body member and adapted for mounting in said longitudinal ways.

3. Apparatus as recited in claim 2 wherein said body and said bracket comprise an integral metallic member.

4. Apparatus as recited in claim 1 further comprising:
means for applying a spring tension against said tool in one direction; and wherein
said spring tension means is preloaded so as to yield only upon the exertion of a given minimum force against said tool in a direction reverse to said one direction.

5. A combination steady-rest and cut-off tool holder for a lathe machine of the type having ways longitudinal to a means for holding a work piece, comprising:
a body member having an opening thwrethrough and adapted to receive in said opening said work piece held by said lathe;
means mounted in said body member for steadying said workpiece in said opening;
a cuttoff tool holding member joined to an outer side of said body member;
a cutoff tool slidably mounted in said holding member and adapted to extend into said opening at an angle to said workpiece;
a threaded screw for advancing said cut-off tool through said holding member and against said workpiece, said screw extending through said holding member at an end distal from said body member and along a line axial with said tool;
at least one preloaded spring washer interposed between said threaded screw and said tool;
another threaded screw extending normal to said tool through said holding member;
at least one preloaded spring washer interposed between said another screw and said tool;
means for movably mounting said body member in said longitudinal ways and
fulcrum means bearing between said tool and said tool holding member and including a slot therein adapted to receive said tool, said fulcrum adapted to provide a degree of oscillation for the tool with respect to the workpiece.

* * * * *